Patented Feb. 12, 1924.

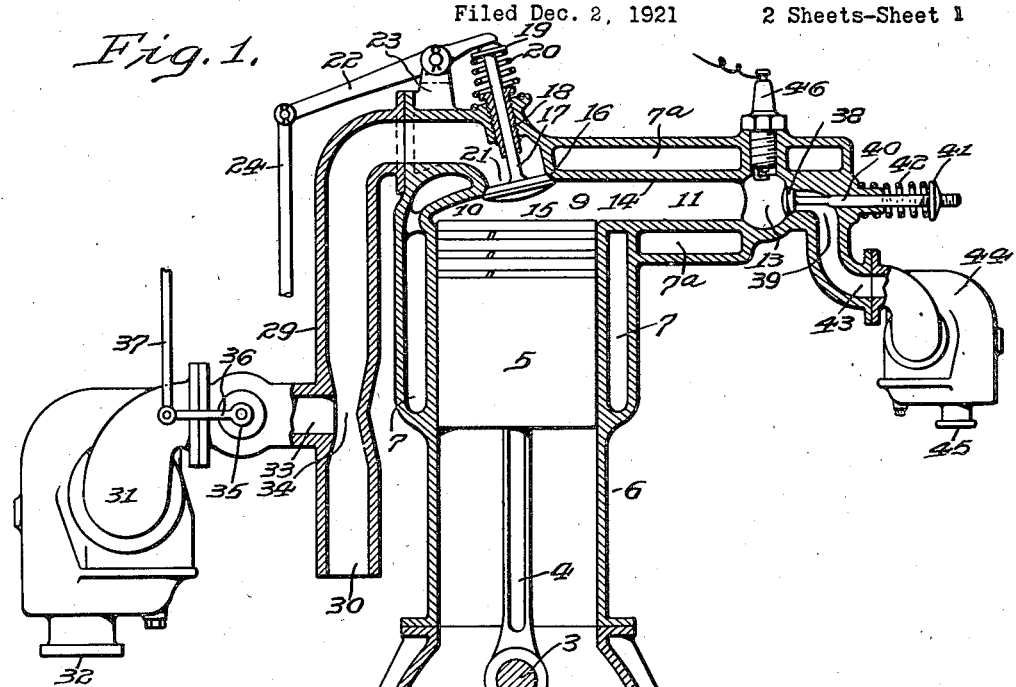

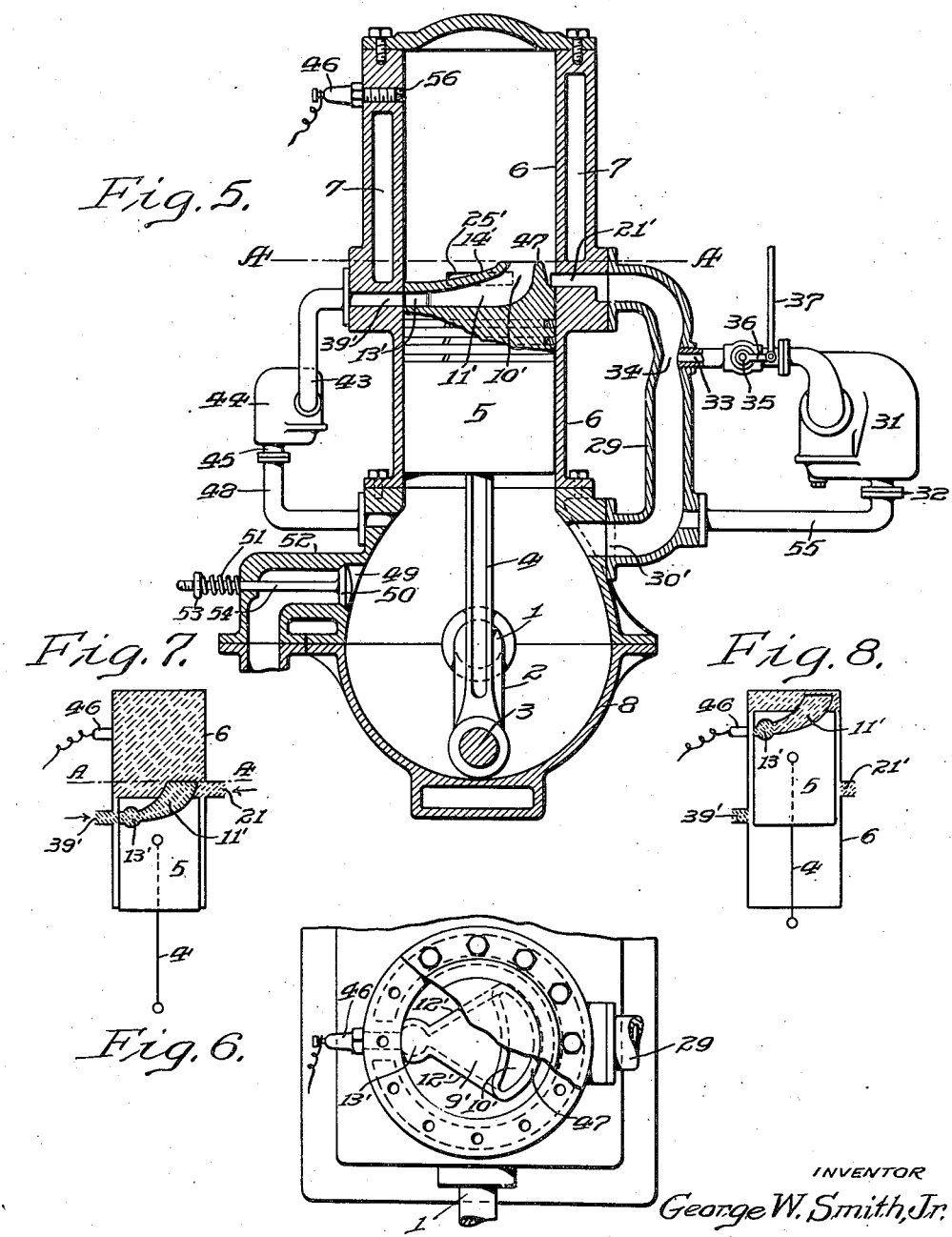

1,483,619

UNITED STATES PATENT OFFICE.

GEORGE W. SMITH, JR., OF RIVERTON, NEW JERSEY.

INTERNAL-COMBUSTION ENGINE.

Application filed December 2, 1921. Serial No. 519,340.

*To all whom it may concern:*

Be it known that I, GEORGE W. SMITH, Jr., a citizen of the United States, and a resident of Riverton, county of Burlington, State of New Jersey, have invented certain new and useful Improvements in Internal-Combustion Engines, of which the following is a specification.

My invention relates to internal combustion engines, and more particularly to those engines in which two combustible mixtures, of different grades or kinds, are simultaneously employed, one a true explosive mixture, and the other generally a leaner mixture, which is adapted to be ignited by the explosion of the richer mixture the total volume of said charges, taken in on each intake, being substantially constant. The ordinary way of varying the charge supplied to a four-cycle internal combustion engine which is subjected to variable loads, such, for example, in an automobile, is by throttling the fuel intake; that is to say, by varying the amount or volume of explosive mixture supplied to the engine on the intake stroke, and the design of such engines is such that when the engine is running under the full load and at a predetermined speed the degree of compression is such as to cause the charge, upon the explosion thereof, to exert its maximum efficiency. It will therefore be apparent that when the engine is running under lighter loads, or for any reason requires less fuel the throttling of the fuel intake will result in the admission of a smaller volume of explosive mixture, with the result that the degree of compression to which such smaller volume is subjected will be correspondingly varied, with a consequent loss of efficiency in engine performance.

And the same is also true, to a greater extent, in cases of a two-cycle internal combustion engine in which the new or incoming fuel is used to displace the spent gases of combustion resulting from the previous working stroke, because, if the amount of fuel supplied be reduced, as by throttling, the incoming fuel will not displace all of the gases of combustion, but will be mixed with and diluted by a portion of the spent gases, with a consequent decrease in the efficiency of the operation of the engine running under a light load. My invention has for its object, the admission, on each intake stroke of a two-cycle or a four-cycle internal combustion engine, of a constant volume of combustible mixture whereby the degree of compression, to which each charge is subjected on the compresion stroke, is maintained substantially constant, while the actual combustible fuel supplied thereto may be varied or diminished to correspond to the work imposed upon the engine.

A further object of my invention is to provide a construction whereby two fuels (one an explosive mixture of constant volume and uniform in quality, and the other an ignitable mixture of constant volume and variable quality) may be maintained in the engine substantially unmixed during the intake and compression strokes, in what may be termed in a superposed or stratified condition; that is to say, in two substantially unmixed bodies or masses or volumes in direct contact with each other.

A further object of my invention is to supply two grades of fuel through two independent in-takes, to an internal combustion engine and to hold said mixtures stratified and substantially unmixed until the end of the compression stroke.

A further object of my invention is to provide a construction or arrangement in which, on the intake stroke, an explosive mixture is admitted to and substantially fills a small explosive chamber and a tapering or expanding passage leading therefrom and forming a part of a main combustion chamber, and a leaner inferior mixture or mixture of a variable quality, is admitted directly to and fills the cylinder, and the adjacent portion of the combustion chamber.

A further object of my invention is to provide a construction in which, on the compression stroke, the explosive mixture is compressed to the volume of, and substantially fills, a small explosion chamber, while the leaner or variable mixture is compressed to the volume of and substantially fills the main combustion chamber of the engine including the said expanding or tapering passage.

A further object of my invention is to provide a main combustion chamber with a tapering or expanding passage in direct communication with a relatively small explosive chamber, the shape and size of such passage being such that the flame or heat resulting from the explosion of an explosive mixture in a relatively small explosion chamber, spreads and extends to every point of the main combustion chamber, and raise the temperature of the main charge of inferior or poorer mixture to a point where it ignites.

A further object of my invention is to provide a construction, of the character above set forth, which is adapted for use in either a four or a two-cycle internal combustion engine.

A further object of my invention is to provide a means whereby only a small amount of explosive mixture sufficient, when under compression, to substantially fill a small explosion chamber, is required for the successful and economical operation of an internal combustion engine subjected to variable loads and required to operate at widely different speeds, and in which a mixture, unexplosive under the compression obtainable in a low compression engine, may be used to substantially supply the main power for performing the work imposed upon the engine.

A further object of my invention is to provide an engine construction in which the volume of air supplied for each intake stroke is constant, while the amount of actual combustible fuel supplied is variable, and is merely sufficient to perform the work imposed upon the engine at that time.

A further object of my invention is to obtain, in an internal combustion engine of the Otto type, a constant compression with a variable amount of combustible fuel and a consequent close approximation to the efficiency of an engine of the Diesel type, under variable loads.

Further objects of my invention will appear in the specification and claims below.

In the drawings, which are of a more or less diagrammatic character, and in which the same reference characters are used throughout the various views to designate the same parts, Fig. 1 is a vertical sectional view of a four-cycle internal combustion engine embodying my invention, and Fig. 2 is a plan view of the top of the same with the small explosion chamber and a portion of the tapering passage of the main combustion chamber shown in section.

Figs. 3 and 4 are diagrammatic views; Fig. 3 showing how the two mixtures are taken into the cylinder, and their relative disposition at the end of the intake stroke, and Fig. 4 showing their relative positions at the end of the compression stroke.

Fig. 5 is a vertical section of a two-cycle internal combustion engine embodying my invention; and Fig. 6 is a plan view, partly in section, showing the supplemental or explosion chamber mounted on the top of the piston.

Figs. 7 and 8 are diagrammatic views similar to Figs. 3 and 4; Fig. 7 showing the relative positions of the two mixtures at the end of the intake stroke and Fig. 8 showing their relative positions on compression at the end of the compression stroke.

In Figs. 1 and 2, the engine is of the four-cycle type, and comprises the main or crank shaft 1, the crank 2 and crank pin 3, the connecting rod 4, pivoted to the piston 5, which are mounted to reciprocate in a cylinder 6, provided with the water-jacket 7—7. The crank preferably is contained or mounted within a crank case 8.

Above the cylinder 6 and in communication with the interior thereof, is a combustion chamber 9 which, at its larger end 10, is substantially circular in plan view and is of substantially the same diameter as that of the bore in the cylinder 6. This combustion chamber 9, extending outwardly laterally from the cylinder, provides a tapering passage or chamber 11, the side walls 12—12 of which converge toward each other, as clearly indicated in Fig. 2. The smaller end of the tapering chamber 11 is in direct communication with a small, preferably spherical explosion chamber 13.

The top wall 14 of the combustion chamber 9 over the cylinder 6 is provided with two valves 15 and 26 which in construction are preferably alike, one of them the main intake valve 15 of the engine; being shown in Fig. 1. This valve 15 is that through which the main or major portion of the charge is taken into the cylinder 6 on the intake stroke. This valve 15 is normally held on a seat 16 in the top wall 14 of the combustion chamber 9. It is preferably provided with a stem 17 passing through a suitable bushing 18, and the end of the stem 17 may be provided with an adjustable nut 19 between which and the bushing 18, is compressed a suitable spring 20 tending to hold the valve 15 on its seat 16. This valve 15 controls the main intake passage or port 21, as is clearly shown in Fig. 1. The combustion chamber may be provided with a suitable water jacket 7ª, 7ª, 7ª. A tappet lever 22, pivoted in the bracket 23, is operated through a suitable link or connecting rod 24 from the cam shaft (not shown) so that the valve 15 may be automatically opened, by said lever 22, at the proper time in the cycle of operation of the engine, (the intake stroke) to admit the main or working charge of combustible mixture directly above and into the cylinder 6 and that part of the combustion chamber directly thereover.

An exhaust port 25, controlled by an exhaust valve 26 is also suitably mounted on the combustion chamber 9, said valve being operated by a lever 27 pivoted on the bracket 23 and similarly connected to and operated by a connecting rod 28 oscillated by the usual cam and cam shaft (not shown). This exhaust valve 26 may be, and preferably is, exactly like the valve 15, but it is operated by the cam shaft to permit of the exit, on the scavenger stroke, of the gases resulting from the combustion of the charge of the preceding working stroke of the engine. The main or inlet passage or port 21 communicates with a suitable pipe or conduit 29, the end 30 of which is open to the atmosphere. For supplying a combustible mixture to the main inlet pipe 29 there may be provided a main carbureter 31, the inlet 32 of which communicates with the atmosphere and the outlet 33 of which communicates directly with the inlet pipe 29, preferably at the Venturi passage 34 in the inlet pipe 29. The outlet 33 of the carbureter, is preferably provided with a valve 35 having an arm 36 connected by a link 37 to any suitable manually operable throttling lever, or to an automatic governing mechanism (not shown), the construction being such that a movement of the link 37 and lever 36 in one direction is operative to reduce the amount of mixture supplied to the intake pipe 21 through the outlet 33 of the carbureter 31, and a movement in the opposite direction is operative to increase the supply of said mixture thereto.

The small explosion chamber 13 may be provided with a suitable check valve 38 controlling the port 39 in the wall of the explosion chamber 13. The valve 38 is preferably provided with a stem 40 extending through the casing and the end thereof may be provided with an adjustable nut 41 between which and the casing a spring 42 is compressed, the action of the spring being such as to tend to hold the valve 38 on its seat 39. The pipe 43 connects the port 39 with a carbureter 44 having its air intake 45 open to the atmosphere.

Mounted within the explosion chamber 13 is an ordinary spark plug 46 by means of which the explosive mixture in the chamber 13 may be ignited at the proper time by any suitable well-known and ordinary system of electric ignition for internal combustion engines.

The size of the explosion chamber 13 will, of course, depend upon the particular conditions under which a particular engine is required to operate. It may be accurately determined for a particular engine using a specified non-explosive fuel to be admitted through the port 21, by computing how much heat will be required to raise the temperature of that fuel at full compression pressure to a point where it ignites and burns. The amount of heat required to raise the temperature of such lean, heavy or non-explosive fuel being known, the amount of an explosive mixture which must be consumed to impart that amount of heat to the said non-explosive mixture is readily determinable.

In order to keep the two fuels stratified or in two substantially unmixed bodies or volumes prior to the ignition of the explosive mixture, the expansion ratio of the engine must be known. Thus, for example, if the ratio of the total clearance of the engine to the piston displacement plus the said clearance be as one to five, (1:5) then the space within the explosive chamber must bear a ratio to the entire space to the right of the line A, A, of Fig. 2, of one to five (1:5). When so proportioned, the larger volume of combustible mixture, which may be lean or non-explosive at compression pressures, is admitted on the intake stroke through the port 21 and it follows the piston downwardly to substantially completely fill the cylinder, and the part 10 of the combustion chamber which is to the left of the line A, A, in Fig. 2 at the completion of the intake stroke. During this stroke, an explosive mixture will also be drawn in over or through the valve 38 which is so adjusted that the volume of explosive mixture so admitted will fill the explosive chamber 13 and the tapering portion 11 of chamber 9 up to the line A, A of Fig. 2 at the end of the intake stroke. Thus the space to the right of the line A, A will be filled with a true explosive mixture. The explosive mixture will be pocketed in the space to the right of the line A, A, Fig. 2 and its volume, as compared with the volume of the explosion chamber 13 alone, should bear the relation of, for instance, five to one, (5:1) when that is the compressive ratio of the engine, as is assumed in the example above given.

This is perhaps more clearly illustrated in Fig. 3 which shows the relative positions of the parts and of the mixtures at the end of the intake stroke.

On the compression stroke, the gases contained in the explosion chamber 13 and in the tapering or expanding passage 11 will be compressed. The explosive mixture will be crowded back and compressed into the explosion chamber 13 until its volume is substantially equal to that of the said explosion chamber 13. The entire combustion chamber including the tapering passage 11, but excluding the explosion chamber 13, will then be filled with the lean or non-explosive mixture. This position of the piston is illustrated in Fig. 4 and the relative positions of the two mixtures, just prior to explosion, are therein indicated. The explosive mixture is shown as crowded back into, and substantially filling, the explosion chamber 13. At substantially the completion of the compression stroke, the explosive mixture in the chamber 13 will be exploded by the spark plug 46. The explosion of contents of the explosion chamber 13 will instantly spread throughout the tapering passage 11 and throughout the entire combustion chamber 9. The flame of the explosion immediately and instantaneously spreads, as the gas expands, throughout the tapering passage 11 of the combustion chamber 9, almost instantly raises the temperature of the leaner or heavier or normally non-explosive mixture to a point where it is ignited by the heat of the exploding mixture. Thus the combustion of the non-explosive mixture is substantially simultaneous with the explosion of the explosive mixture in the chamber 13 and the piston moves downward under the expansive action of both ignited mixtures.

After the working stroke has been thus completed, the exhaust valve 26 is opened by the usual cam shaft action and the gases of combustion are expelled through the exhaust valve 26 on the upward stroke of the piston.

It is to be noted that a constant volume of air, or air admixed with fuel, is taken into the cylinder on each intake stroke of the engine; that the valve 35 does not vary this volume and that a constant volume of explosive mixture is also admitted through the port 39. Consequently the combustible mixture is always compressed to substantially the same degree or pressure irrespective of the amount of fuel that may be admixed with the air, whether the engine is running at high or low speeds, and whether the engine is subjected to more or less work. This results in an efficient operation of an engine subjected to variable loads and run at varying speeds as distinguished from the usual operation in which the volume of gases admitted in the intake stroke is varied by throttling the volume of gas admitted.

The tapering shape of the tapering or expanding chamber 11 assists in maintaining unmixed, the two combustible fuels during the intake and the compression strokes, but it also assists in the intimate mixing of the two mixtures upon the explosion of the small volume of relative rich mixture in the chamber 13. This flaring shape permits the gas therein to expand or contract in volume without forming eddies. It permits the expanding gases, or the gases being compressed therein to progagate and maintain a substantial wave front, without eddies, all of which tends to keep the two kinds of mixtures separate during the intake and compression strokes. Upon the explosion of the mixture in the small supplemental chamber 13, the tapering form of the chamber or passage 11 permits the exploded gases to expand with the same kind of a wave front, and to traverse the entire combustion chamber and clearance, and to reach every particle of the lean charge, to be heated thereby, without substantial loss in energy.

My invention as applied to a two-cycle internal combustion engine is illustrated in Figs. 5 and 6. The main crank shaft 1 and crank 2, crank pin 3, connecting rod 4, piston 5, cylinder 6, water jackets 7—7, and crank case 8 may be, and preferably are, of the ordinary two-cycle engine type of construction, and correspond to the similar parts of the four-cycle engine above described. In this construction, however, the explosion chamber 13' and the expanding or tapering passage 11' leading therefrom, and formed by the tapering side walls 12'—12' and the top wall 14', are mounted on or in the upper end of the piston 5, and the passage 11' preferably discharges upwardly. Between the mouth of the tapering or expanding passage 11' and the adjacent wall of the cylinder is provided a baffle 47 which serves to deflect upwardly the main charge admitted through the main port 21.

When the piston is at the end of its downward stroke the explosion chamber 13' is in registration with the port 39' through which a true explosive mixture is admitted to the explosion chamber 13' and to the expanding passage 11' communicating thereunto and carried by the piston. The outlet passage 43 of the carbureter 44 is connected with this port 39' and the inlet 45 of the carbureter is connected through a pipe 48 with the interior of the crank case 8. This crank case, is arranged to compress air on the downward stroke of the piston, and to transfer the air, when compressed at the end of the working stroke, to the upper end of the cylinder, for expelling from the cylinder through the exhaust port 25' the products of combustion of the previous working stroke and for filling the cylinder with a fresh combustible mixture. For this purpose, the crank case 8 may be provided with an air inlet or port 49, controlled by a check valve 50, held on its seat in the port 49 by a spring 51 interposed between the hollow casing 52 and an adjustable nut 53 threaded over the outer end of the valve stem 54.

When the piston 5 is in its lowermost position, that is to say at the end of the working stroke, the main inlet port 21', is in communication with the interior of the cylinder 6 above the piston. The port 21' is connected by a pipe or conduit 29, having therein the restricted Venturi passage 34, and the lower end 30' of the pipe 29 is connected to the casing 8 in communication with the interior thereof. Entering the Venturi passage 34 in the conduit 28 is the outlet 33 of the main carbureter 31, the inlet 32 of which is connected by a pipe 55 with the interior of the casing 8, preferably through the lower end 30' of the conduit 29.

The outlet 33 of the carbureter 31 may be controlled by a valve 35 having an arm 36 operated by the link 37 connected to a throttle lever or to a governor mechanism to vary the amount of fuel delivered from the carbureter 31 into the Venturi passage or tube 34 of the main intake pipe or conduit 29.

When the piston 5 is at the upper end of its travel,— that is to say, at the end of the compression stroke,—the explosion chamber 13' will be in registration and communication with a small chamber 56 in which is mounted the spark plugs 46 as shown in Fig. 5.

In the position shown in Fig. 5 the engine is assumed to be at the end of its working stroke, and the air, compressed in the crank case 8, is being conducted through the pipe 29 and Venturi passage 34 to the main inlet port 21' and striking against the baffle 47 is displacing the spent or burned gases, forcing them through the now open exhaust port 25'. The carbureter 31 is shown as shunted into this main air supply conduit, and therefore fuel will be forced or drawn from the carbureter 31, through the outlet 33 into the Venturi passage 34, where it is admixed with the air passing therethrough.

Simultaneously with this operation, the air under compression in the crank case, passing through the pipe 48 and the carbureter 44, will cause the carbureter 44 to deliver through the supplemental intake passage 39' a predetermined amount of true explosive mixture, said mixture, passing through the inlet port 39' to the explosion chamber 13', being sufficient to fill the explosion chamber 13' and the tapering passage 11' leading therefrom, up to the crescent-shaped discharge orifice thereof, that is to say, up to the line A, A. (See Fig. 7).

On the upward stroke of the piston, the main port 21', the exhaust port 25', and the supplemental intake port 39' will all be closed by the piston. The rich or explosive mixture trapped in the tapering passage 11' and the explosion chamber 13' will be compressed as will also the poorer or leaner charge above the piston. At the end of the compression stroke, the explosive mixture will be compressed back into, and will fill the explosion chamber 13', while the clearance at the top of the cylinder and the tapering passage 11' will be filled with the leaner non-explosive mixture. The relative position of the parts and the disposition of the mixtures within the cylinder are shown in Fig. 8. It is at this time that the explosion chamber 13' is in registration with the small chamber 56 in which is located the spark plug 46, and at the completion of the compression stroke the ignition system of the engine will be operated to cause a spark at the spark plug, to ignite the rich expansive mixture in the explosion chamber 13', as in the embodiment of my invention previously described, the heat generated by the compression of the charge and by the explosion of the explosive mixture in the explosion chamber 13' will raise the temperature of the leaner or poorer mixture to its ignition point.

As also in the modification previously described, the size and proportion, and shape of the explosion chamber 13' and the expanding or the tapering chamber 11' will be proportioned with respect to the clearance of the engine, to correspond to the compressive or expansive ratio of the engine.

It will be readily seen that my invention is applicable to different types or kinds of internal combustion engines. I have shown and described engines of the two-cycle and the four-cycle types. My invention is adapted, however, to substantially any low compression internal combustion engine which is operated on variable loads or at variable speeds, and it is not to be construed therefore as limited to the exact details shown in the drawings, and described in the specification for many changes in size, proportion and arrangement of parts are fully contemplated by me and may be made without departing from the spirit and scope of my invention.

It is also to be understood that the fuel, which is added to and mixed with the air by the two carbureters, may be the same liquid fuel, or different fuels. When the same fuel is used the mixture supplied for the main or working charge may be and generally will be a leaner one than that supplied to the explosion chamber 13, the latter necessarily being of a quality adapted to be invariably exploded by the spark plug therein. The fuels may be of different kinds, however, that is to say the main charge may comprise a mixture of air with a heavy less volatile fuel (e. g. kerosene), the temperature of which is raised to its ignition point on compression by the heat generated by the explosion of a good explosive mixture (e. g. a gasoline mixture) and the employment of any fuel or fuels, in the manner and for the purposes above described, are also fully within the aim and scope of my invention.

Having thus described my invention, what I claim and desire to protect by Letters Patent of the United States is:

1. In an internal combustion engine, the combination of a cylinder, a working piston therein, means for supplying to said cylinder a constant volume of air on each intake stroke, means for mixing with said air a variable amount of fuel, said amount being substantially proportional on each intake to the load then on the engine, a relatively small explosion chamber, means comprising a tapering passage or chamber connecting said explosion chamber with the interior of said cylinder, the small end of said passage or chamber opening into said explosion chamber, and means for supplying a constant volume of explosive mixture to said explosion chamber and to said passage on each intake stroke of the engine.

2. In an internal combustion engine, the combination of a cylinder, a working piston therein, means for supplying to said cylinder a constant volume of air on each intake stroke, means for mixing with said air a variable amount of fuel, said amount being substantially proportional on each intake to the load then on the engine, a relatively small explosion chamber, means comprising a tapering passage or chamber connecting said explosion chamber with the interior of said cylinder, the transverse dimensions of the small end of said tapering passage being less than the diameter of said explosion chamber and opening into said explosion chamber, and means for supplying a constant volume of explosive mixture to said explosion chamber and to said passage on each intake stroke of the engine.

3. In an internal combustion engine, the combination of a cylinder, a working piston therein, means for supplying to said cylinder a constant volume of air on each intake stroke, means for mixing with said air a variable amount of fuel, said amount being substantially proportional on each intake to the load then on the engine, a relatively small explosion chamber, means comprising a tapering passage or chamber connecting said explosion chamber with the interior of said cylinder, the small end of said passage or chamber opening into said explosion chamber, and means for supplying a constant volume of explosive mixture to said explosion chamber and to said passage on each intake stroke of the engine, the volume of said explosive mixture so admitted to the explosive chamber and tapering passage being substantially equal, under the compression of the engine at the end of the compression stroke, to the capacity of said explosion chamber.

4. In an internal combustion engine, the combination of a cylinder, a working piston therein, means for supplying to said cylinder a constant volume of air on each intake stroke, means for mixing with said air a variable amount of fuel, said amount being substantially proportional on each intake to the load then on the engine, a relatively small explosion chamber, means comprising a tapering passage or chamber connecting said explosion chamber with the interior of said cylinder, the small end of said passage or chamber opening into said explosion chamber, and means for supplying a constant volume of explosive mixture to said explosion chamber and to said passage on each intake stroke of the engine, the volume of the explosive mixture admitted to said explosion chamber and tapering passage at intake pressure bearing the same ratio to the capacity of said explosion chamber that the piston displacement, added to the engine clearance, bears to said engine clearance.

5. In an internal combustion engine, the combination of a cylinder, a working piston therein, means for supplying to said cylinder a constant volume of air on each intake stroke, means for mixing with said air a variable amount of fuel, said amount being substantially proportional on each intake to the load then on the engine, a relatively small explosion chamber, means comprising a tapering passage or chamber connecting said explosion chamber with the interior of said cylinder, the small end of said passage or chamber opening into said explosion chamber, and means for supplying a constant volume of explosive mixture to said explosion chamber and to said passage on each intake stroke of the engine, the volume of explosive mixture admitted on the intake stroke being sufficient, when exploded, to heat the variable mixture to its ignition point at the end of the compression stroke.

6. In an internal combustion engine, the combination of a cylinder, a working piston therein, means for introducing substantially into the cylinder only, a main charge comprising a mixture which will not normally ignite under the compression of the engine, a relatively small explosion chamber, an expanding chamber connecting said small chamber with the interior of said cylinder, means for introducing into said explosion chamber a supplemental charge comprising a mixture which is readily ignitible under the compression of the engine, said supplemental charge completely filling said explosion chamber and a substantial portion of said expanding chamber on the intake stroke, and means for igniting said supplemental charge at the end of the compression stroke of said engine, whereby the heat generated by the explosion of said explosive mixture raises the temperature of and ignites said normally non-ignitible main charge.

7. In an internal combustion engine, the combination of a cylinder, a working piston therein, means for introducing substantially into the cylinder only, a main charge comprising a constant volume of a mixture which will not normally ignite under the compression of the engine, a relatively small explosion chamber, an expanding chamber connecting said small chamber with the interior of said cylinder, means for introducing into said explosion chamber a supplemental charge comprising a constant volume of a mixture which is readily ignitible under the compression of the engine, said supplemental charge completely filling said explosive chamber and a substantial portion of said expanding chamber on the intake stroke, and means for igniting said supplemental charge at the end of the compression stroke of said engine, whereby the heat generated by the explosion of said explosive mixture raises the temperature of and ignites said normally non-ignitible main charge.

8. In an internal combustion engine, the combination of a cylinder and workig piston therein, a relatively small explosion chamber rigidly connected to and extending outwardly from the head of said cylinder and connected with the interior of said cylinder by an expanding passage, the smaller end of which is in communication with said explosion chamber, means for admitting directly to the cylinder, a main charge comprising a normally non-explosive mixture, means for admitting a supplemental charge of explosive mixture to said explosion chamber and said passage, and means for igniting said explosive mixture at the end of the compression stroke of said engine, whereby the heat generated by the combustion of the explosive mixture raises the temperature of the main charge to its ignition point and ignites the same.

9. In an internal combustion engine, the combination of a cylinder, a piston therein, an explosion chamber, a passage connecting said explosion chamber with said cylinder, the ratio of the cubical capacity of said explosion chamber to the cubical capacity of said passage being substantially the same as the ratio of the entire engine clearance to the piston displacement, means to fill said explosion chamber and said passage during the intake stroke of the engine with an explosive mixture which will readily ignite under the compressive pressure of the engine, means to fill said cylinder during the intake stroke with a combustible mixture which, unheated, does not ignite under the compressive pressure of the engine, said mixtures being substantially stratified in the engine at the end of the intake stroke, means to maintain the stratification of said mixtures during the compression stroke of the engine whereby at the end of said compression stroke said explosive chamber is filled with the said explosive mixture and the said passage and the clearance in the cylinder are filled with said combustible mixture, and means to ignite said explosive mixture in the explosion chamber at substantially the end of the compression stroke whereby the heat generated by the explosion of the explosive mixture raises the temperature of the said combustible mixture and ignites said combustible mixture.

In witness whereof, I have hereunto set my hand this first day of December, 1921.

GEORGE W. SMITH, Jr.